US012179227B2

(12) United States Patent
Fritz et al.

(10) Patent No.: US 12,179,227 B2
(45) Date of Patent: Dec. 31, 2024

(54) CLEANING DEVICE FOR AN APPLICATION DEVICE

(71) Applicant: Dürr Systems AG, Bietigheim-Bissingen (DE)

(72) Inventors: Hans-Georg Fritz, Ostfildern (DE); Benjamin Wöhr, Eibensbach (DE); Jerome Lavallée, Albstadt (DE); Moritz Bubek, Ludwigsburg (DE); Timo Beyl, Besigheim (DE); Frank Herre, Oberriexingen (DE); Steffen Sotzny, Oberstenfeld (DE); Daniel Tandler, Stuttgart (DE); Tobias Berndt, Stuttgart (DE); Georg Sommer, Ditzingen (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 619 days.

(21) Appl. No.: 17/299,047

(22) PCT Filed: Dec. 4, 2019

(86) PCT No.: PCT/EP2019/083642
§ 371 (c)(1),
(2) Date: Jun. 2, 2021

(87) PCT Pub. No.: WO2020/115117
PCT Pub. Date: Jun. 11, 2020

(65) Prior Publication Data

US 2022/0040719 A1 Feb. 10, 2022

(30) Foreign Application Priority Data

Dec. 7, 2018 (DE) ..................... 10 2018 131 380.2

(51) Int. Cl.
*B05B 15/55* (2018.01)
*B05B 12/08* (2006.01)
(Continued)

(52) U.S. Cl.
CPC .......... *B05B 15/555* (2018.02); *B05B 12/082* (2013.01); *B41J 2/16552* (2013.01)

(58) Field of Classification Search
None
See application file for complete search history.

(56) References Cited

U.S. PATENT DOCUMENTS 5,589,225 A 12/1996 Yamada et al.
5,627,571 A * 5/1997 Anderson ................ B41J 2/125 347/42

(Continued)

FOREIGN PATENT DOCUMENTS

DE 19508725 A1 9/1995
DE 19936790 A1 2/2001

(Continued)

OTHER PUBLICATIONS

International Search Report and Written Opinion for PCT/EP2019/083642 mailed Mar. 18, 2020 (14 pages; with English translation).

(Continued)

*Primary Examiner* — Cristi J Tate-Sims
(74) *Attorney, Agent, or Firm* — Taft Stettinius & Hollister LLP; Thomas E. Bejin

(57) ABSTRACT

The disclosure relates to a cleaning device for cleaning an application device which, in operation, applies at least one coating agent jet of a coating agent (e.g. paint) to a component (e.g. motor vehicle body component). The disclosure provides that a jet checking device is integrated into the cleaning device for checking the coating agent jet emitted by (Continued)

the application device, so that the cleaning device forms a structural unit with the jet checking device.

32 Claims, 6 Drawing Sheets

(51) Int. Cl.
*B05B 15/555* (2018.01)
*B41J 2/165* (2006.01)

(56) References Cited

U.S. PATENT DOCUMENTS

| | | | |
|---|---|---|---|
| 6,811,807 B1 | 11/2004 | Zimmermann et al. | |
| 7,721,745 B2 | 5/2010 | Baumann et al. | |
| 7,908,994 B2 | 3/2011 | Herre et al. | |
| 8,418,647 B2 | 4/2013 | Martin | |
| 9,452,451 B2 | 9/2016 | Kleiner et al. | |
| 10,426,253 B2 | 10/2019 | Baumann et al. | |
| 10,906,058 B2 | 2/2021 | Nelson et al. | |
| 2004/0221804 A1 | 11/2004 | Zimmermann et al. | |
| 2005/0237357 A1 | 10/2005 | Usuda | |
| 2007/0089762 A1 | 4/2007 | Baumann et al. | |
| 2007/0090128 A1 | 4/2007 | Martin | |
| 2008/0236484 A1 | 10/2008 | Herre et al. | |
| 2010/0214597 A1* | 8/2010 | Hasseler | B41J 29/38 358/1.15 |
| 2014/0075695 A1 | 3/2014 | Keliner et al. | |
| 2015/0375258 A1 | 12/2015 | Fritz et al. | |
| 2017/0072421 A1 | 3/2017 | Baumann et al. | |
| 2018/0052443 A1 | 2/2018 | Van Riet et al. | |
| 2018/0214901 A1 | 8/2018 | Nelson et al. | |
| 2019/0308211 A1* | 10/2019 | Fritz | B05B 12/149 |

FOREIGN PATENT DOCUMENTS

| | | | | |
|---|---|---|---|---|
| DE | 102007036585 A1 | 4/2009 | | |
| DE | 102010052698 A1 | 5/2012 | | |
| DE | 102013002412 A1 | 8/2014 | | |
| DE | 102014006647 A1 | 11/2015 | | |
| DE | 102016206995 A1 | 10/2017 | | |
| DE | 112016001682 T5 | 2/2018 | | |
| DE | 102016014951 A1 | 6/2018 | | |
| EP | 0110634 A2 | 6/1984 | | |
| EP | 1671706 A2 | 6/2006 | | |
| EP | 3354354 A1 | 8/2018 | | |
| JP | 3435260 B2 | 8/2003 | | |
| JP | 2005305869 A | 11/2005 | | |
| JP | 2011011431 A | 1/2011 | | |
| JP | 2012135746 A | 7/2012 | | |
| JP | 2011201308 A | 1/2013 | | |
| JP | 2015066531 A | 4/2015 | | |
| JP | 2017074535 A | 4/2017 | | |
| JP | 2020501880 A | 1/2020 | | |
| KR | 20110001443 A | 1/2011 | | |
| WO | WO-2012044307 A1 * | 4/2012 | | B41J 2/125 |

OTHER PUBLICATIONS

Office Action from German Patent Office for Application No. DE 10 2018 131 380.2 mailed Sep. 10, 2019 (3 pages; English translation not available).
Notification of Reasons for Rejection from the Japan Patent Office for related application No. JP2021532170 mailed Sep. 26, 2023 (9 pages; with English translation).
EPO Draft Office Action for related Application No. EP 19817623.2 (with English machine translation).
Japan Patent Office Notification of Reasons for Rejection for related application No. JP2021-532170 mailed Feb. 13, 2024 (11 pages; with English translation).
Notification of Reasons for Rejection from the Japan Patent Office for related application No. JP2021-532170 mailed Jul. 2, 2024 (5 pages; with English translation).
Korean Intellectual Property Office Notice of Office Action for related application No. KR10-2021-7021276 mailed Aug. 19, 2024 (19 pages; with English translation).

* cited by examiner

Cleaning position

Checking position

CLEANING DEVICE FOR AN APPLICATION DEVICE

CROSS-REFERENCE TO RELATED APPLICATIONS

This application is a national stage of, and claims priority to, Patent Cooperation Treaty Application No. PCT/EP2019/083642, filed on Dec. 4, 2019, which application claims priority to German Application No. DE 10 2018 131 380.2, filed on Dec. 7, 2018, which applications are hereby incorporated herein by reference in their entireties.

FIELD

The disclosure relates to a cleaning device for cleaning an application device (e.g. print head or non-atomizing application device) which, in operation, applies at least one coating agent jet of a coating agent (e.g. paint, adhesive, sealant) to a component (e.g. motor vehicle body component). Furthermore, the disclosure comprises an operating method for such a cleaning device.

BACKGROUND

In modern painting systems for painting motor vehicle body components, rotary atomizers are usually used as application device, which atomize the coating agent to be applied and deliver a spray cloud of the coating agent. When the color is changed or during breaks in operation (e.g. during a shift change or at the weekend), these rotary atomizers must be cleaned on the outside and inside to prevent contamination with paint residues or adhesion of paint residues. For this purpose, cleaning devices are known from the prior art, which are described, for example, in EP 1 671 706 A2, DE 10 2014 006 647 A1 and DE 10 2010 052 698 A1.

However, a disadvantage of the known rotary atomizers is the fact that the application efficiency is not 100%, so that part of the applied paint has to be disposed of as overspray.

To avoid this problem, a more recent line of development envisages the use of so-called print heads as application devices instead of rotary atomizers, as described for example in DE 10 2013 002 412 A1. Such print heads do not emit a spray jet, but instead emit narrowly limited coating agent jets from small nozzles, so that no overspray occurs during operation. By “coating agent jet” can be understood both a coherent jet, not yet subject to natural decay, and a directed jet consisting at least in part of droplets.

However, a problem with such print heads is the fact that the nozzles of the print heads can become clogged during operation, leading to malfunction. DE 10 2016 014 951 A1 therefore discloses a jet checking device that can detect such clogging of a coating agent nozzle of such a print head.

A disadvantage of the prior art is therefore the fact that the known cleaning devices are designed for rotary atomizers and are therefore not suitable for print heads. A further disadvantage of the prior art is that the cleaning of the print heads on the one hand and the inspection of the coating agent jets on the other hand have so far had to be carried out in separate devices.

Finally, with regard to the general technical background of the disclosure, reference should be made to EP 3 354 354 A1, DE 11 2016 001 682 T5 and DE 10 2016 206 995 A1.

DETAILED DESCRIPTION

Figure 1:
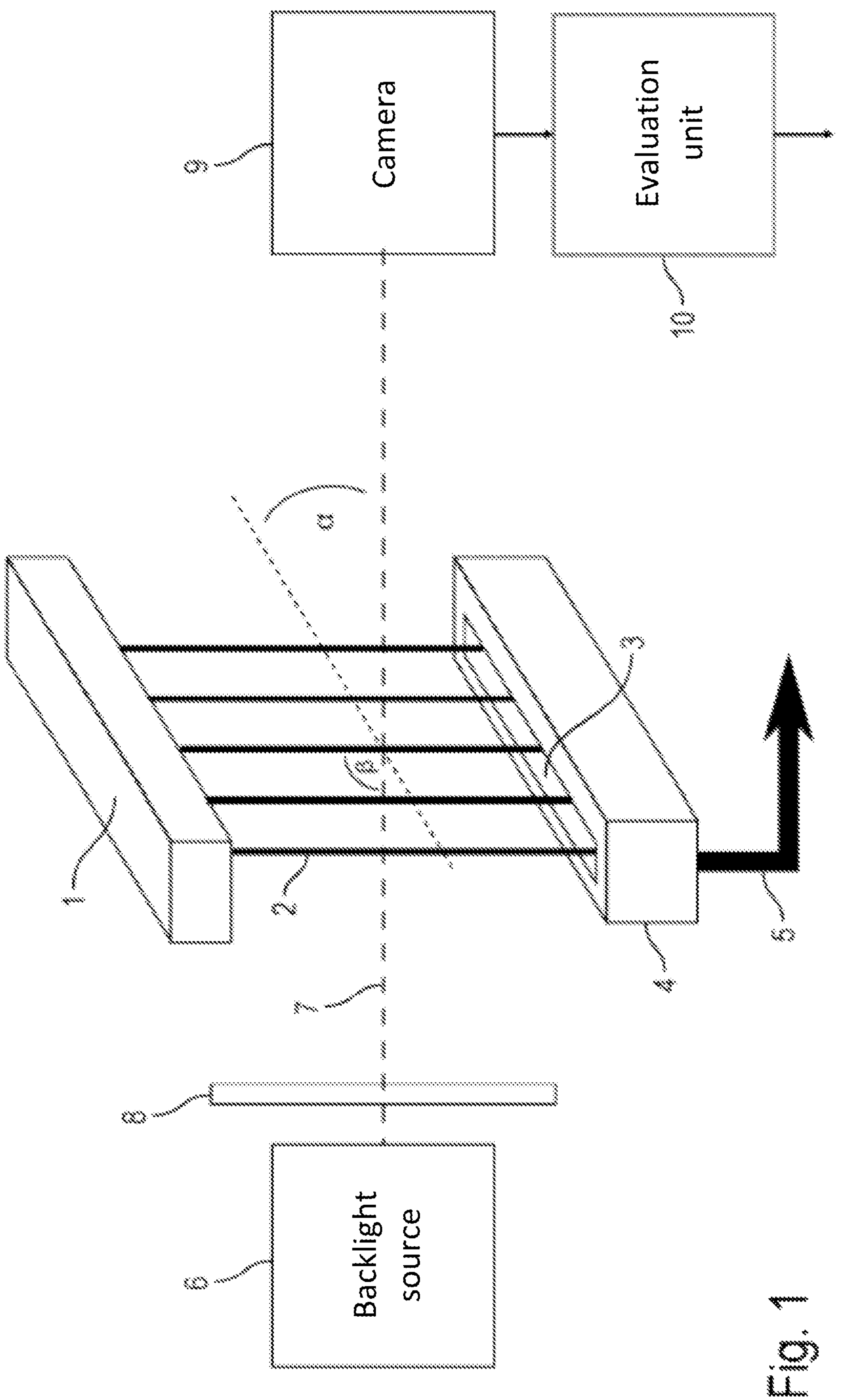
FIG. 1 a schematic representation of a cleaning device according to the disclosure with an integrated jet checking device, FIG. 2 another schematic representation of the cleaning device according to FIG. 1, FIG. 3 a simplified top view of the insertion opening of the cleaning device according to FIGS. 1 and 2, FIG. 4A a schematic representation of a cleaning device according to the disclosure, wherein a robot positions a print head in a cleaning position, FIG. 4B a variation of FIG. 4A, wherein the robot positions the print head in a test position.

The disclosure describes a cleaning device for an application device (e.g. print head) and a jet checking device in a single structural unit. First of all, this offers the advantage that only one device is required for jet checking and for cleaning. A further advantage is that one of two collecting devices for paint residues can be dispensed with, since otherwise separate devices would require one collecting device each for the cleaning device and for the jet checking device. In addition, the disclosure makes it possible to provide a central solution for paint booths and to dispense completely with a washout or dry separation system.

With regard to the design features of the cleaning device, reference can be made in part to the prior art, so that reference can be made, for example, to DE 10 2010 052 698 A1 (also cited as United States Patent Application Publication No. US2014/0075695 A1 and U.S. Pat. No. 9,452,451 B2), DE 10 2014 006 647 A1 (also cited as United States Patent Application Publication No. US2017/0072421 A1 and U.S. Pat. No. 10,426,253 B2) and EP 1 671 706 A2 (also cited as United States Patent Application Publication Nos. US 2007/0089762 A1; US2008/0236484 A1; US 2007/0090128 A1 and U.S. Pat. Nos. 7,721,745 B2; 7,908,994 B2; and 8,418,647 B2) which are incorporated herein by reference. With regard to the constructive design of the jet checking device, reference can also be made in part to the prior art as described, for example, in DE 10 2016 014 951 A1 (also cited as United States Patent Application Publication No. US 2019/0308211 A1) which is incorporated herein by reference.

In a preferred embodiment of the disclosure, the application device to be cleaned and measured is a print head as known, for example, from DE 10 2013 002 412 A1 (also cited as United States Patent Application Publication No. US 2015/0375258 A1) which is incorporated herein by reference. At this point, however, it should be mentioned that the term of a print head used in the context of the disclosure serves to distinguish it from atomizers which apply a spray cloud of the atomized coating agent (e.g. paint). In contrast, a print head in the sense of the disclosure emits one or more narrowly limited coating agent jets, which can, for example, have a jet widening angle of less than 5° or 2°, 1°, 0.5° or 0.1°. Such print heads are thus essentially free of overspray, i.e. the application efficiency is practically 100%.

It should be mentioned here that the coating agent jets can optionally consist of individual, separated coating agent drops or of a sequence of coating agent drops. Alternatively, it is possible for the individual coating agent jets to be connected in the longitudinal direction of the jet, whereby these alternatives are known from the prior art cited at the beginning and therefore need not be described in detail.

In the preferred embodiment of the disclosure, the jet checking device comprises a sensor, in particular an optical sensor, such as a camera or a high-speed camera, for detecting the at least one coating agent jet.

In the case of checking the at least one coating agent jet by means of an optical sensor, the jet checking device has an illumination source, preferably a backlight source, which emits a light beam onto the optical sensor, the coating agent jet to be checked running in the beam path of the light beam between the backlight source and the optical sensor, so that the optical sensor checks the coating agent jet in the backlight.

In the preferred embodiment of the disclosure, the light beam of the back light source extends transversely (e.g., at right angles, orthogonally) to the coating agent jet to be inspected. In this case, the light beam of the back light source extends transversely, in particular substantially at right angles, to the jet plane.

In another embodiment, the light beam of the back light source runs tangentially, in particular essentially at an angle of 0°, to the jet plane.

It is also possible to check both orientations of the back light source to the jet plane in succession. For this purpose, either the opening in the cleaning device must be large enough to accommodate the jets at both orientations, or there must be two separate openings with different orientations. Furthermore, it is possible to make the collecting device movable, in particular rotatable, in order to be able to check the different orientations of the jet plane.

Furthermore, it should be mentioned that the application device (e.g. print head) typically emits several parallel coating agent jets which lie in a common jet plane. Here, the light beam of the back light source is preferably aligned transversely (e.g., perpendicularly, orthogonally) to the jet plane of the coating agent jets.

Furthermore, it should be mentioned that the jet checking device preferably comprises an optical diffuser arranged in the jet path of the back light source between the back light source and the coating agent jet to be checked, so that the back light is diffuse.

For example, the diffuser may be arranged in a fixed position so that diffuse backlight is used in any operating condition. However, it is alternatively possible that the diffuser is arranged to be movable and can be selectively moved into or out of the beam path of the back light source to selectively provide the back light diffusely or in a focused form.

Furthermore, it should be mentioned that the jet checking device preferably inspects the coating agent jet in a specific inspection region (ROI: Region of Interest), wherein the spatially limited inspection region is preferably located immediately after the exit from the application device, i.e. immediately in front of the nozzle openings of the application device, for example at a distance of 0-100 mm, especially of 0-70 mm, in particular of 0-40 mm.

In addition, the preferred embodiment has an evaluation unit which is connected to the sensor on the input side and determines at least one of the following variables from the sensor signal:

- Number of coating agent jets exiting the application device. In this way, for example, the clogging of a coating agent nozzle can be detected if the number of coating agent jets detected does not correspond to the number of coating agent nozzles.
- Exit angle of the at least one coating agent jet. In this way, an incipient clogging of a coating agent nozzle can be detected, since this often manifests itself in a slightly oblique exit of the respective coating agent jet.
- Parallelism of the coating agent jets relative to each other. This can also be useful, for example, to detect clogging of the coating agent nozzles of the print head, since the coating agent jets can then emerge at a slight angle, as already mentioned above.
- Decay length of the at least one coating agent jet, wherein the decay length is the length of the initially continuous coating agent jet from which the coating agent jet decays into individual coating agent drops. This can also be useful, for example, to detect an incipient clogging of the coating agent nozzles of the print head, since clogging of the coating agent nozzles results in a shorter decay length.
- Delay time of the individual coating agent jets between a valve opening command and the subsequent detection of the associated coating agent jet, whereby the delay time is determined individually for the individual coating agent jets. This individual delay time can then be compensated for when controlling the individual valves for the individual coating agent nozzles of the print head.
- Size of the individual coating agent droplets of the coating agent jet.
- Distance of the neighboring coating agent drops along the coating agent jet.

With regard to the structural design of the cleaning device, it should be mentioned that the cleaning device preferably comprises a cleaning container for receiving the application device or at least the coating agent jets emitted by the application device during cleaning. The cleaning container preferably has an insertion opening, which is preferably arranged on the upper side of the cleaning container, for receiving the application device to be cleaned or at least the coating agent jets emitted by the application device. The insertion opening is preferably sufficiently large to receive all of the coating agent jets from the application device without the coating agent jets contaminating the outer surface of the cleaning device.

In a particular embodiment, the cleaning device has at least one additional opening into which the application device dispenses the coating during the measurement, i.e., an opening for the cleaning process and at least one additional opening for the jet checking process.

Preferably, at least one cleaning nozzle is arranged in the cleaning container for spraying the application device from the outside with a cleaning fluid. For example, the cleaning fluid may be a rinsing agent for water-based fluids or for fluids based on organic solvents. This also includes mixtures containing other substances in addition to water and/or organic solvents, such as wetting agents, co-solvents or other additives. The cleaning nozzle may be stationarily arranged in the cleaning container. Preferably, however, the at least one cleaning nozzle is arranged movably in the cleaning container, for example rotatably or pivotably, whereby the cleaning effect can be improved. However, the cleaning nozzle can also be moved linearly (back and forth), for example by means of a cylinder. On its underside, the cleaning tank can have a discharge to allow residues of the coating agent and the cleaning agent to be drained off into a recirculation system. Furthermore, it should be mentioned that at least one cleaning nozzle is preferably arranged in the cleaning container in order to blow a drying gas (e.g. compressed air) onto the application device from the outside. Similar to the cleaning nozzle, the drying nozzle can be rotatably or pivotally mounted or moved linearly (back and forth).

The cleaning nozzle preferably emits a flat jet of the cleaning agent from a substantially linear nozzle arrangement, for example, from a slot nozzle or from numerous outlet nozzles arranged in a row of nozzles. The application device can also have several application nozzles arranged in a nozzle row. Here, it is advantageous if the linear nozzle arrangement of the cleaning nozzles is aligned essentially parallel to the nozzle row of the application nozzles. The flat jet of cleaning agent preferably strikes the row of application nozzles obliquely from below, at an angle of 5-45°, in particular 15-35°, relative to the jet direction of the application nozzles. It is advantageous if the point of impact of the cleaning agent is not directed directly onto the application nozzles in order to prevent cleaning agent from entering the application nozzles or paint from being flushed out of the application nozzles.

With regard to the drying nozzle, it should be mentioned that this can also be stationary or movable. If the drying nozzle is movable, it can be moved by a pneumatic linear cylinder, for example. The drying nozzle also emits the drying gas preferably in the form of a flat jet from a substantially linear nozzle arrangement, in particular from a slot nozzle or from numerous outlet nozzles arranged in a row of nozzles. Here, the linear nozzle arrangement of the drying nozzles is preferably oriented transversely to the nozzle row of the application nozzles.

Furthermore, the cleaning device may comprise a moisture retaining device to keep the outlet nozzles of the application device moist. Such a moisture-retaining device may, for example, comprise a trough, a nonwoven fabric, a sponge, and/or a porous material that is impregnated with a solvent or through which the solvent flows. For example, the moisture-retaining device may also comprise a supply line and/or a discharge line for the solvent.

It should be mentioned, however, that it is possible within the scope of the operating method according to the disclosure for cleaning and jet measurement to be carried out several times in succession. The cleaning of the application device (e.g. print head) is then repeated until the subsequent jet checking of the applied coating agent jets shows that proper jet delivery is taking place. With this cyclic repetition of cleaning and jet measurement, it is possible that increasingly intensive cleaning programs are used.

FIG. 1 first shows a print head 1 which applies a plurality of coating agent jets 2 of a coating agent, wherein the coating agent jets 2 are aligned equidistantly and parallel to one another. In the drawing, only five of the coating agent jets 2 are shown. In fact, however, the print head 1 can emit a substantially larger number of the coating agent jets 2. It should be mentioned here that the coating agent jets 2 are emitted from coating agent nozzles which are arranged in the print head 1 in a linear row of nozzles next to each other.

In the drawing, the coating agent jets 2 are emitted into an insertion opening 3 of a cleaning device 4, the cleaning device 4 being shown here only schematically.

The cleaning device 4 has a drain 5 on its underside for discharging residual coating agent and rinsing agent.

The print head 1 can be cleaned in the cleaning device 4. For this purpose, the print head 1 is lowered onto the cleaning device 4, as will be described in detail.

In FIG. 1, however, the print head 1 is in a checking position in which the print head 1 is raised from the cleaning device 4. In this checking position, a jet checking device structurally integrated into the cleaning device 4 enables measurement of the coating agent jets 2 emitted by the print head 1.

First of all, the jet checking device comprises a back light source 6 which guides a light beam 7 through a diffuser 8 so that the coating agent jets 2 are illuminated with a diffuse back light.

Furthermore, the jet checking device comprises a camera 9, which is arranged in the beam path of the light beam 7 of the back light source 6 behind the coating agent jets 2 and measures the coating agent jets 2.

The light beam 7 of the back light source runs at an angle $\beta=90°$ to the coating agent jets 2 and at an angle $\alpha=90°$ to the nozzle row in the print head 1.

The image signal from the camera 9 is then forwarded to an evaluation unit 10, which evaluates the image signal and can determine, for example, the number of the coating agent jets 2, the exit angle of the coating agent jets 2, the decay length of the coating agent jets 2 and other variables.

It should be mentioned here that the jet checking device is drawn separately from the cleaning device 4 in the drawing. However, this is only to illustrate the operation of the jet checking device. In fact, the jet checking device and the cleaning device 4 form a structural unit.

Figure 2:
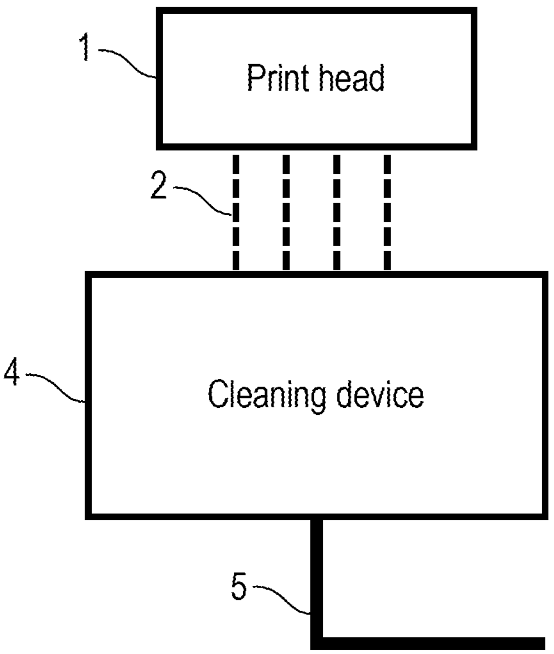
Figure 3:
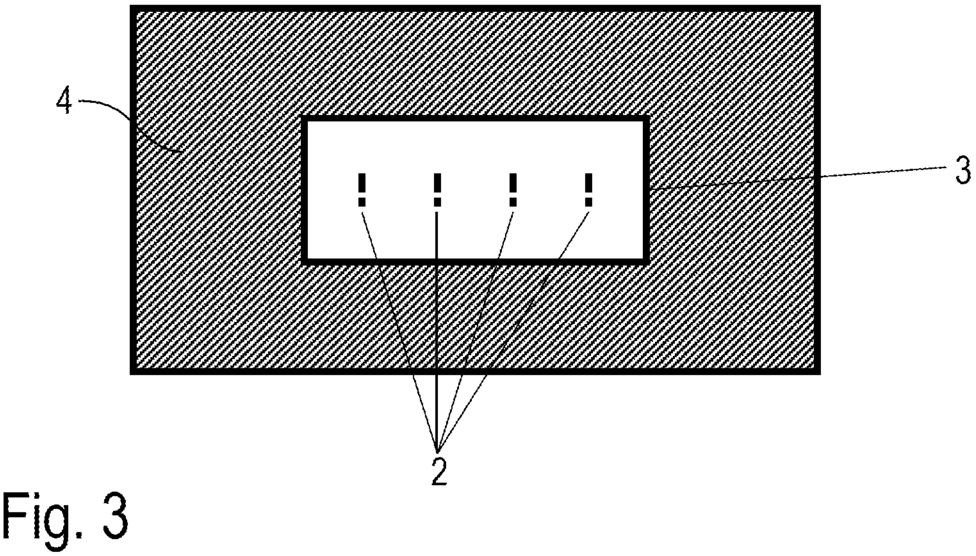

FIGS. 2 and 3 show other views of the overall device from FIG. 1, so that reference is made to the above description in order to avoid repetition.

In the following, the embodiment according to FIGS. 4A-4C will now be described, whereby this embodiment partly corresponds to the embodiment described above, so that reference is made to the above description in order to avoid repetitions, whereby the same reference signs are used for corresponding details.

Figure 4A:
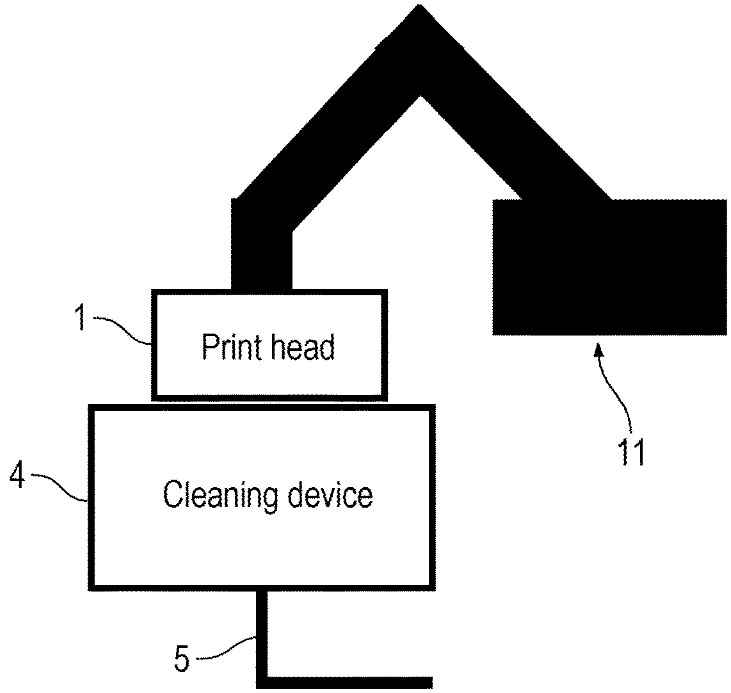
FIG. 4C is a flowchart of the operation of the cleaning device according to FIGS. 4A-4B, FIG. 5 a schematic representation of a modification of the cleaning device according to FIG. 1, and FIG. 6 a schematic representation of a coating system according to the disclosure.
Figure 4B:
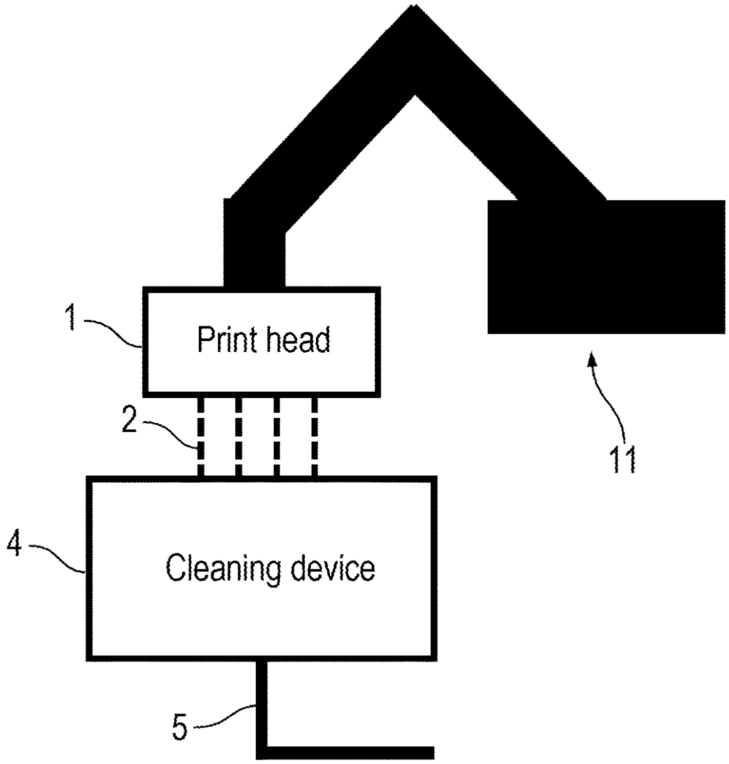
Figure 4C:
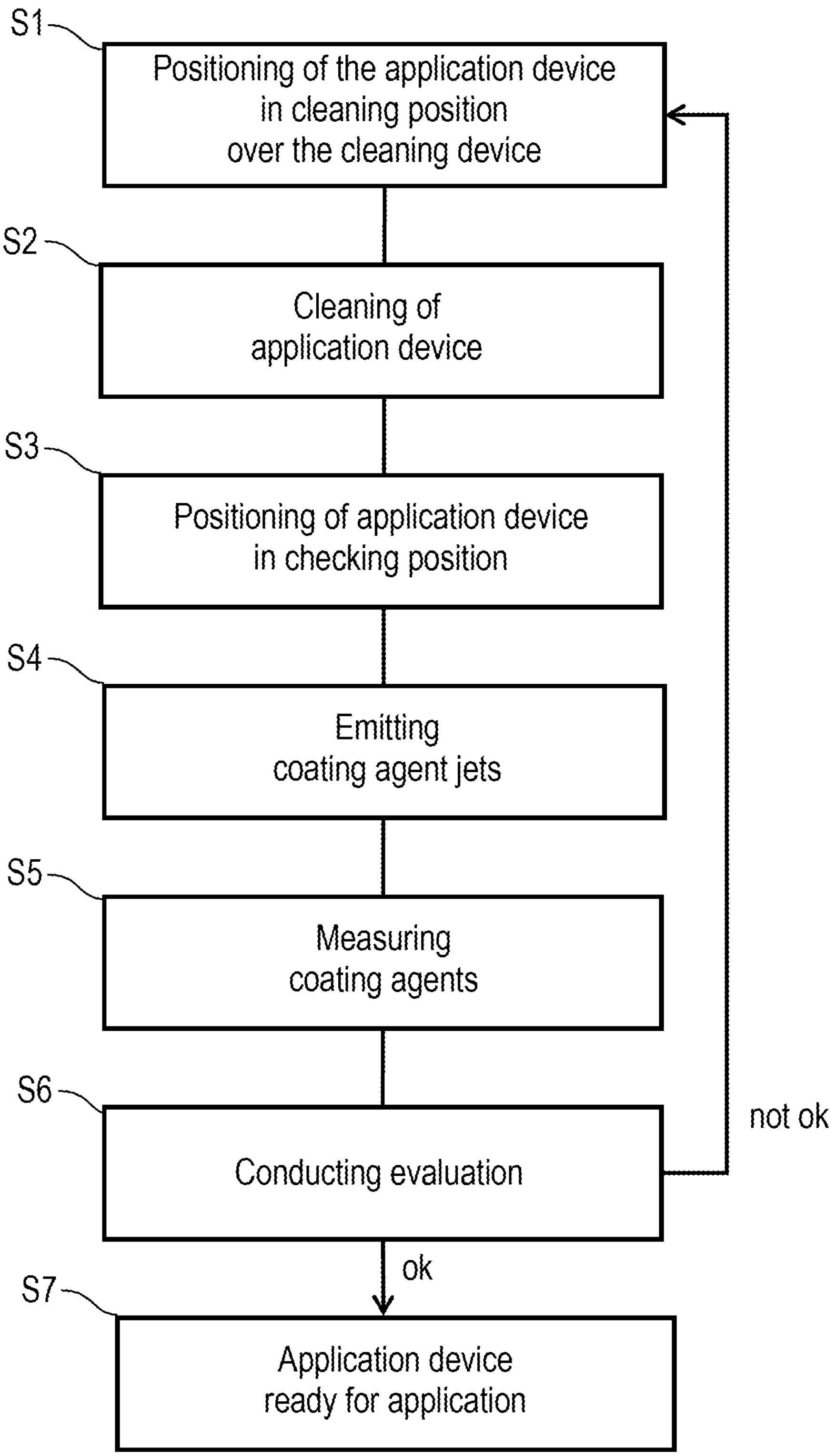

It can be seen from FIGS. 4A and 4B that the print head 1 is moved by a multi-axis painting robot 11 with serial robot kinematics, the structure of the painting robot 11 being known per se from the prior art and therefore not needing to be described in detail.

FIG. 4A shows how the painting robot 11 positions the print head 1 in a cleaning position above the cleaning device 4. In this cleaning position, the print head 1 is directly above the cleaning device 4 or even in direct contact with it. In this cleaning position, the outlet nozzles of the print head 1 can be cleaned by a cleaning fluid sprayed from the inside against the outlet nozzles.

FIG. 4B, on the other hand, shows how the painting robot 11 positions the print head 1 in a checking position in which the print head 1 is lifted off the cleaning device 4. In this checking position, the coating agent jets 2 nevertheless enter completely into the insertion opening 3 of the cleaning device 4 without the outer surfaces of the cleaning device 4 being soiled by the coating agent jets 2. The camera 9 can then measure the coating agent jets 2, as already explained above.

In the following, the flow chart according to FIG. 4C will now be explained.

In a first step S1, the print head 1 is moved to the cleaning position as shown in FIG. 4A.

In a subsequent step S2, the print head 1 is then cleaned in the cleaning position by the cleaning device 4.

Subsequently, in a step S3, the painting robot 11 then moves the print head 1 to a checking position shown in FIG. 4B.

In a step S4, the print head 1 then ejects the coating agent jets 2.

In a step S5, the coating agent jets 2 are then measured by the camera 9.

If the evaluation in a subsequent step S7 then shows that the coating agent jets 2 are not emitted properly, steps S1-S6 are repeated with renewed cleaning.

If, on the other hand, the evaluation shows that the coating agent jets 2 are properly emitted, the print head 1 is ready for normal application of the coating agent in a step S7.

Figure 5:
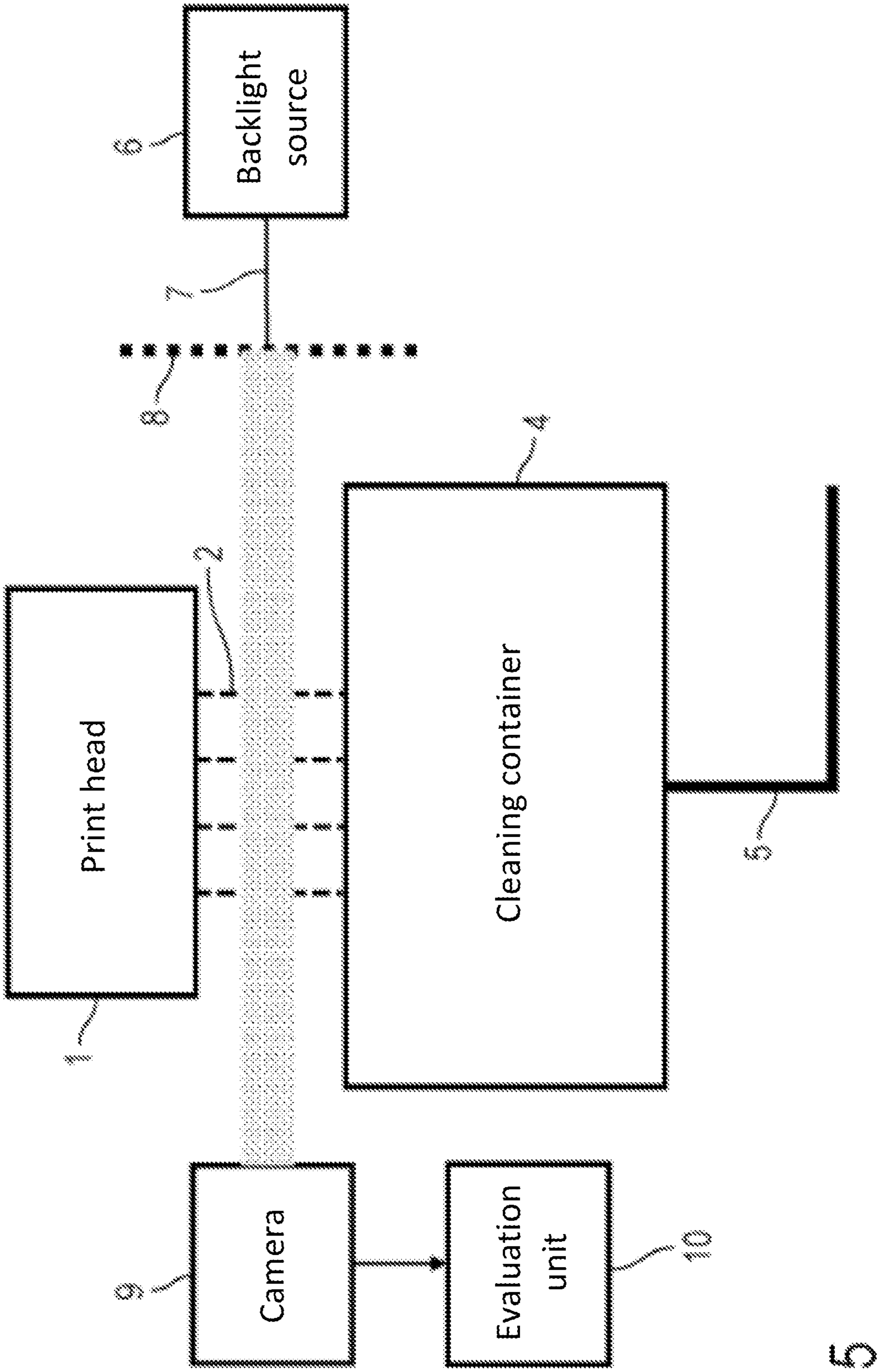

FIG. 5 shows a modification of the embodiment according to FIG. 1, so that in order to avoid repetitions, reference is made to the above description of FIG. 1, whereby the same reference signs are used for corresponding details.

A special feature of this embodiment is that the light beam 7 of the back light source 6 runs at an angle $\alpha=0°$ in the jet plane of coating agent jets 2.

Figure 6:
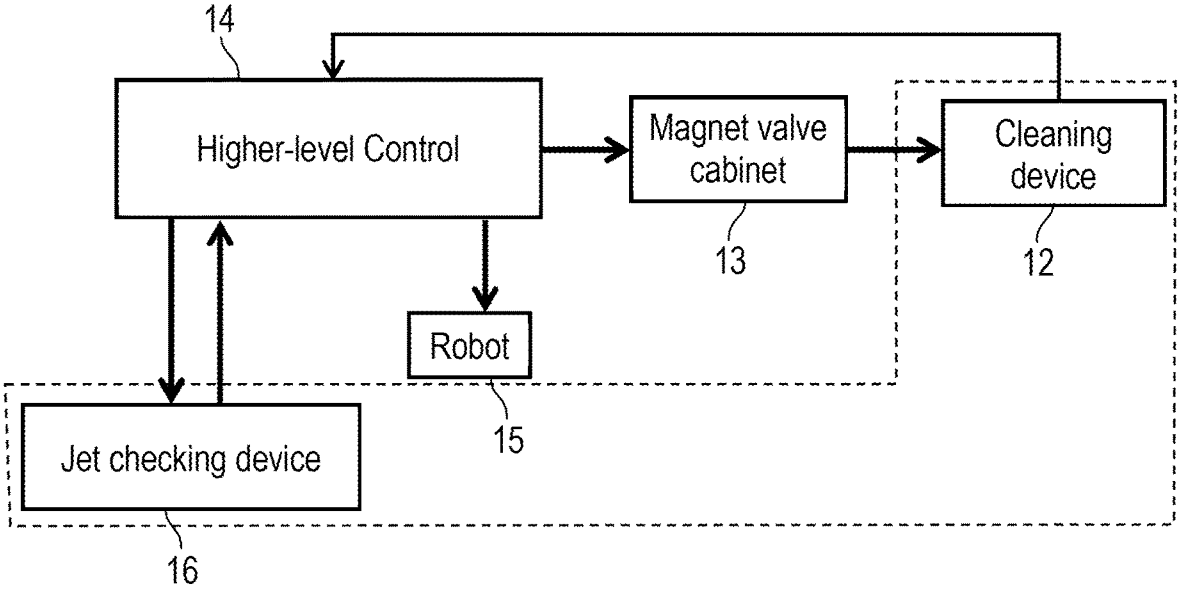

FIG. 6 shows a schematic representation of a coating system according to the disclosure with a cleaning device 12, which is controlled by a higher-level control system 14 via a magnet valve cabinet 13. In addition, FIG. 5 shows a painting robot 15 which guides an application device and is controlled by the controller 14.

Finally, the drawing also shows a jet checking device 16, which is used to measure the coating agent jets emitted by the application device, as described above.

The dashed line here illustrates that the jet checking device 16 and the cleaning device 12 form a structural unit.

It should be mentioned here that the control system controls both the cleaning device 12 and the jet checking device 16 and the painting robot 15.

The disclosure is not limited to the preferred embodiments described above. Rather, a large number of variants and variations are possible which also make use of the idea of the disclosure and therefore fall within the scope of protection.

The invention claimed is:

1. An assembly, comprising:

a cleaning device for cleaning an application device which, in operation, applies at least one coating agent jet of a coating agent to a component, and a jet checking device integrated in the cleaning device in order to check the at least one coating agent jet emitted by the application device, so that the cleaning device forms a structural unit with the jet checking device, the jet checking device having a sensor for detecting the at least one coating agent jet, and the jet checking device having an evaluation unit which is connected to the sensor and determines from a sensor signal of the sensor at least one of the following variables:

a) parallelism of the coating agent jets relative to each other, or b) delay time of the individual coating agent jets between a valve opening command and the detection of the associated coating agent jet, the delay time being determined individually for the individual coating agent jets.

2. The assembly according to claim 1, wherein the sensor is an optical sensor.

3. The assembly according to claim 1, wherein the sensor is a camera.

4. The assembly according to claim 2, wherein the jet checking device has a backlight source which emits a light beam onto the optical sensor, the coating agent jet to be checked running in the beam path of the light beam between the backlight source and the optical sensor, so that the optical sensor tests the coating agent jet in the backlight.

5. The assembly according to claim 4, wherein a) the light beam of the backlight source runs transversely to the coating agent jet to be checked, and b) the application device emits a plurality of parallel coating agent jets which run in a common jet plane.

6. The assembly according to claim 5, wherein the light beam of the back light source runs transversely to the jet plane.

7. The assembly according to claim 5, wherein the light beam of the back light source runs in the jet plane or at an acute angle to the jet plane.

8. The assembly according to claim 4, wherein the jet checking device has a diffuser which is arranged in the beam path of the back light source between the back light source and the coating agent jet to be checked, so that the back light is diffuse.

9. The assembly according to claim 8, wherein the diffuser is arranged movably and can be moved selectively into the beam path of the back light source or out of the beam path of the back light source in order to deliver the back light selectively in diffuse or bundled form.

10. The assembly according to claim 1, wherein the jet checking device checks the coating agent jet in a specific checking area immediately after it emerges from the application device.

11. The assembly according to claim 1, wherein the cleaning device has a cleaning container for receiving the application device during cleaning.

12. The assembly according to claim 11, wherein the cleaning container has an insertion opening in order to receive the coating agent jets and/or to be able to insert the application device into the cleaning container for cleaning.

13. The assembly according to claim 12, wherein the insertion opening is sufficiently large to be able to receive all coating agent jets of the application device without the coating agent jets soiling the outer surface of the cleaning device.

14. The assembly according to claim 12, wherein the apparatus has at least one second opening for receiving the coating agent jets during the checking.

15. The assembly according to claim 11, wherein at least one cleaning nozzle is arranged in the cleaning container for spraying the application device from the outside with a cleaning fluid.

16. The assembly according to claim 11, wherein the at least one cleaning nozzle is arranged stationary.

17. The assembly according to claim 11, wherein the at least one cleaning nozzle is arranged movable.

18. The assembly according to claim 11, wherein the cleaning container has a discharge on its underside for discharging residues of the coating agent and cleaning fluid.

19. The assembly according to claim 11, wherein at least one drying nozzle is arranged in the cleaning container in order to blow a drying gas onto the application device from the outside.

20. The assembly according to claim 19, wherein the at least one drying nozzle is arranged stationary.

21. The assembly according to claim 20, wherein the at least one drying nozzle is arranged movable.

22. The assembly according to claim 11, wherein a) the cleaning container has a first introduction opening for receiving the at least one coating agent jet during cleaning of the application device, and b) the cleaning container has a second insertion opening for receiving the at least one coating agent jet during jet checking.

23. The assembly according to claim 15, wherein a) the cleaning nozzle emits a flat jet of the cleaning fluid from a substantially linear nozzle arrangement, b) the application device has a plurality of application nozzles arranged in a nozzle row, c) the linear nozzle arrangement of the cleaning nozzles is aligned essentially parallel to the nozzle row of the application nozzles.

24. The assembly according to claim 23, wherein the flat jet of the cleaning fluid is directed obliquely relative to the nozzle row and from below onto the nozzle row of the application nozzles.

25. The assembly according to claim 23, wherein the flat jet of the cleaning fluid is not directed directly onto the application nozzles.

26. The assembly according to claim 19, wherein a) the drying nozzle is movable, b) at least one pneumatic linear cylinder is provided for moving the drying nozzle, c) the drying nozzle emits a flat jet of the drying gas from a substantially linear nozzle arrangement, d) the linear nozzle arrangement of the drying nozzles is aligned transversely to the nozzle row of the application nozzles.

27. The assembly according to claim 1, wherein the cleaning device has a moisture-retaining device for keeping the outlet nozzles of the application device moist.

28. The assembly according to claim 27, wherein the moisture-retaining device comprises at least one of a trough, a nonwoven fabric, a sponge and a porous material, which are impregnated with a solvent or through which the solvent flows.

29. The assembly according to claim 27, wherein the moisture-retaining device comprises at least one of a supply line and a discharge line for the solvent.

30. The assembly according to claim 1, wherein the coating agent jet consists of individual coating agent drops or a sequence of coating agent drops or is contiguous in the longitudinal direction of the jet.

31. An assembly, comprising:

a cleaning device for cleaning an application device which, in operation, applies at least one coating agent jet of a coating agent to a component, and a jet checking device integrated in the cleaning device in order to check the at least one coating agent jet emitted by the application device, so that the cleaning device forms a structural unit with the jet checking device, the jet checking device having an optical sensor for detecting the at least one coating agent jet, the jet checking device has a backlight source which emits a light beam onto the optical sensor, the coating agent jet to be checked running in the beam path of the light beam between the backlight source and the optical sensor, so that the optical sensor tests the coating agent jet in the backlight, and the jet checking device has a diffuser which is arranged in the beam path of the back light source between the back light source and the coating agent jet to be checked, so that the back light is diffuse.

32. The assembly according to claim 31, wherein the diffuser is arranged movably and can be moved selectively into the beam path of the back light source or out of the beam path of the back light source in order to deliver the back light selectively in diffuse or bundled form.

* * * * *